(12) United States Patent
Baldwin

(10) Patent No.: US 12,519,294 B1
(45) Date of Patent: Jan. 6, 2026

(54) CABLE CLAMP FOR ELECTRICAL JUNCTION BOX

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 209 days.

(21) Appl. No.: 18/396,616

(22) Filed: Dec. 26, 2023

Related U.S. Application Data

(60) Provisional application No. 63/452,655, filed on Mar. 16, 2023.

(51) Int. Cl.
*H02G 3/06* (2006.01)
*H02G 3/08* (2006.01)

(52) U.S. Cl.
CPC .......... *H02G 3/0616* (2013.01); *H02G 3/083* (2013.01)

(58) Field of Classification Search
None
See application file for complete search history.

(56) References Cited

U.S. PATENT DOCUMENTS

| | | |
|---|---|---|
| 834,684 A | 10/1906 | Sibley |
| 1,384,332 A | 7/1921 | Mullenux |
| 1,418,990 A | 6/1922 | Thomas, Jr. |
| 1,644,306 A | 10/1927 | Ledbetter |
| 1,776,652 A | 9/1930 | Clayton |
| 2,097,695 A * | 11/1937 | Kingdon .............. H02G 3/0683 285/154.4 |
| 2,200,874 A | 5/1940 | Dann |
| 3,174,776 A | 3/1965 | Berger |
| 3,245,703 A | 4/1966 | Manly |
| 3,346,863 A | 10/1967 | Siebold |
| 3,647,934 A | 3/1972 | Hurtt |
| 3,788,582 A | 1/1974 | Swanquist |
| 3,858,151 A | 12/1974 | Paskert |
| 4,005,882 A | 2/1977 | Rickel |
| 4,361,302 A | 11/1982 | Lass |
| 4,536,613 A | 8/1985 | Gallas |
| 4,880,387 A | 11/1989 | Stikeleather |
| 4,990,721 A | 2/1991 | Sheehan |
| 5,204,499 A | 4/1993 | Favalora |
| 5,647,613 A | 7/1997 | Marik |
| 5,894,109 A | 4/1999 | Marik |
| 5,921,520 A | 7/1999 | Wisniewski |

(Continued)

*Primary Examiner* — Krystal Robinson
(74) *Attorney, Agent, or Firm* — Kenneth C. Booth; Booth Udall, PLC

(57) ABSTRACT

An electrical box cable clamp with a main body having a gap extending from a top end to a bottom end, a clamp wall, a plurality of clips, and a clamp arm structure having a wedge shape formed therein. The main body is configured to provide a pathway for an electrical cable through a wall opening in a wall of an electrical box. The cable clamp has a screw that is configured to move the clamp arm structure towards the clamp wall to grip the electrical cable. As the clamp arm structure is moved towards the clamp wall, the wedge shape is configured to increase the diameter of the main body, securing the cable clamp in the wall opening. The plurality of clips are configured to snap onto and hold the cable clamp to an edge of the wall opening of the electrical box.

20 Claims, 11 Drawing Sheets

(56) References Cited

U.S. PATENT DOCUMENTS

| | | |
|---|---|---|
| 6,257,530 B1 | 7/2001 | Tsai |
| 6,352,439 B1 | 3/2002 | Stark |
| 6,596,939 B1 | 7/2003 | Gretz |
| 6,827,604 B1 | 12/2004 | White |
| 6,861,585 B1 | 3/2005 | Kiely |
| 6,872,886 B2 | 3/2005 | Kiely |
| 6,935,890 B1 | 8/2005 | Gretz |
| 6,935,891 B2 | 8/2005 | Kiely |
| 6,957,968 B1 | 10/2005 | Gretz |
| 7,048,561 B1 | 5/2006 | Elbaz |
| 7,057,107 B2 | 6/2006 | Auray |
| 7,060,900 B1 | 6/2006 | Gretz |
| 7,064,273 B1 | 6/2006 | Kiely |
| 7,075,007 B2 | 7/2006 | Auray |
| 7,211,744 B2 | 5/2007 | Jorgensen |
| 7,222,394 B2 | 5/2007 | Gardner |
| 7,325,838 B2 | 2/2008 | Gardner |
| 7,390,980 B1 | 6/2008 | Gretz |
| 7,432,452 B2 | 10/2008 | Gardner |
| 7,485,806 B1 | 2/2009 | Gretz |
| 7,495,184 B1 | 2/2009 | Gretz |
| 7,703,813 B1 | 4/2010 | Kiely |
| 7,723,623 B2 | 5/2010 | Kiely |
| 7,824,213 B1 | 11/2010 | Korcz |
| 8,143,535 B2 | 3/2012 | Auray |
| 8,162,693 B2 | 4/2012 | Auray |
| 8,253,043 B1 | 8/2012 | Kiely |
| 8,466,378 B1 | 6/2013 | Gretz |
| 8,690,194 B1 | 4/2014 | Smith |
| 8,791,374 B1 | 7/2014 | Smith |
| 8,800,120 B2 | 8/2014 | Benedetti |
| 8,803,008 B2 | 8/2014 | Chavan |
| 8,901,441 B2 | 12/2014 | Sathyanarayana |
| 9,231,388 B2 | 1/2016 | Chavan |
| 9,293,900 B1 | 3/2016 | Gretz |
| 9,373,919 B1 | 6/2016 | Smith |
| 9,431,808 B1 | 8/2016 | Perkins |
| 9,444,235 B1 | 9/2016 | Smith |
| 9,490,061 B2 | 11/2016 | Park |
| 9,490,619 B2 | 11/2016 | Smith |
| 9,705,296 B1 | 7/2017 | Smith |
| 9,865,972 B2 | 1/2018 | Smith |
| 9,935,435 B2 | 4/2018 | Smith |
| 10,135,230 B1 | 11/2018 | Smith |
| 10,269,473 B1 | 4/2019 | Gretz |
| 10,483,735 B1 | 11/2019 | Gretz |
| 10,593,445 B2 | 3/2020 | Gretz |
| 10,601,189 B1 | 3/2020 | Smith |
| 10,892,610 B2 | 1/2021 | Smith |
| 10,923,894 B1 | 2/2021 | Gretz |
| 11,015,751 B2 | 5/2021 | Dhotre |
| 11,223,168 B2 | 1/2022 | Gretz |
| 11,451,030 B2 | 9/2022 | Yang |
| 11,456,582 B1 | 9/2022 | Baldwin |
| 11,649,858 B2 | 5/2023 | Lukas |
| 11,784,428 B2 | 10/2023 | Smith |
| 11,815,206 B2 | 11/2023 | Dickinson |
| 11,898,608 B2 | 2/2024 | Itta |
| 2007/0261881 A1* | 11/2007 | Wronski .......... H02G 3/22 174/153 G |
| 2009/0178845 A1 | 7/2009 | Auray |
| 2010/0279530 A1 | 11/2010 | Auray |
| 2010/0285699 A1 | 11/2010 | Auray |
| 2015/0357806 A1* | 12/2015 | Korcz .......... H02G 15/16 174/541 |
| 2016/0047494 A1* | 2/2016 | Dickinson .......... F16G 11/143 248/74.1 |
| 2017/0163014 A1* | 6/2017 | Korcz .......... H02G 3/085 |
| 2017/0346271 A1* | 11/2017 | Brodeur .......... H02G 1/06 |
| 2020/0091643 A1 | 3/2020 | Smith |
| 2020/0224792 A1 | 7/2020 | Juzak |
| 2021/0384714 A1* | 12/2021 | Yang .......... H02G 3/083 |

\* cited by examiner

CABLE CLAMP FOR ELECTRICAL JUNCTION BOX

RELATED APPLICATIONS

This application claims the benefit of U.S. provisional patent application 63/452,655, filed Mar. 16, 2023 to Baldwin, titled "CABLE CONNECTOR CLAMP FOR ELECTRICAL JUNCTION BOX," the entirety of the disclosure of which is hereby incorporated by this reference.

TECHNICAL FIELD

This document relates generally to electrical box cable clamps, and more specifically to electrical fittings for securing electrical cables to electrical boxes.

BACKGROUND

Conventional snap-in electrical box cable clamps employ a spring temper steel ring that wraps around the body of the cable clamp, such as a spring temper steel ring is wrapped around the body of the clamp. The spring temper steel ring is not a continuous loop and includes a gap between its ends to allow the spring to contract when the clamp is inserted into a cable opening of an electrical box, and then expand to hold the clamp to the box after the clips on the spring pass through the opening. The wall of the electrical box surrounding the cable opening becomes loosely held between the solid ring of the main body for the cable clamp and the steel spring ring clips.

Because the ring is not a continuous ring, however, the ring's position around the clamp body is not constant, making the removal points for the ring inconsistent for when an installer needs to remove the clamp from a box from within the small opening. Additionally, the removal of the cable clamp from the box after it is attached, is very difficult because all of the spring ring clips need to be simultaneously depressed (typically 4 of them), or the spring itself needs to be deformed to remove it from the clamp body, and the spring ring may not conform back to its original shape after it is removed to allow the user to reuse the same clamp. Removal of the clamp body using a spring ring from an electrical box once it is attached is difficult using the above-shown and described design.

SUMMARY

Aspects of this document relate to an electrical box cable clamp comprising a hollow, cylindrical main body configured to provide a pathway for an electrical cable through a wall opening in a wall of an electrical box, the cylindrical main body having a gap in the main body extending vertically from a top end to a bottom end such that the main body is discontinuous wherein the ends forming the gap are curled inwardly, a clamp wall positioned on the top end of the main body, the clamp wall having at least two screws, wherein the clamp wall is configured to contact the electrical cable, wherein the electrical cable passes adjacent the clamp wall when the electrical cable extends along the pathway through the main body, a pair of coplanar flanges positioned symmetrically on either side of the gap along a circumference of the top end, wherein the pair of coplanar flanges extend perpendicular to a side wall of the main body, each of the coplanar flanges comprising an opposing, parallel outer edge extending away from a respective side wall of the main body, a plurality of clips originating from the main body and extending away from the main body, wherein each clip of a first portion of the plurality of clips is oriented in a downward direction and each clip of a second portion of the plurality of clips is oriented in an upward direction opposite the downward direction, wherein each clip of the first portion of the plurality of clips is vertically aligned with a corresponding clip of the second portion of the plurality of clips to form a pair of clips, and wherein each pair of clips is configured to snap onto and hold the cable clamp to an edge of the wall opening of the electrical box, a clamp arm structure configured for positioning atop the flanges, the clamp arm structure comprising a clamp bar having an opening for the at least one screw and configured to engage the electrical cable against the clamp wall, and an arm portion connected perpendicular to the clamp bar, wherein the arm portion comprises two opposing edges having a pair of opposing, parallel open hems configured to wrap around the outer edges of the pair of flanges, the arm portion further comprising a wedge shape formed therein configured to extend into the gap adjacent the top end, the wedge shape having a depth extending towards the bottom end, a narrow end located near a center of the arm portion, and a wide end terminating at an outer edge of the arm portion, and wherein as the clamp arm structure is moved toward the clamp wall, the wedge shape is configured to widen the gap and enlarge the diameter of the main body.

Particular embodiments may comprise one or more of the following features. The plurality of clips may comprise one or more pairs of clips on a front side of the main body. The plurality of clips may comprise one or more pairs of clips on a back side of the main body. The clamp arm structure may comprise a single, unitary piece. The at least two screws are configured to tighten the clamp bar to grip the electrical cable and the wedge shape is configured to increase the diameter of the main body to immobilize the cable clamp within the wall opening.

Aspects of this document relate to an electrical box cable clamp comprising a hollow main body configured to provide a pathway for an electrical cable through a wall opening in a wall of an electrical box, the main body having a gap in the main body extending from a top end to a bottom end and configured to enable a diameter of the main body to be enlarged by widening the gap and reduced by collapsing the gap, a clamp wall positioned on the top end of the main body, the clamp wall having at least one screw and configured to contact the electrical cable, wherein the electrical cable passes adjacent the clamp wall when the electrical cable extends along the pathway through the main body, two or more flanges positioned on opposing sides of the gap at the top end and extending away from the main body perpendicular to a side wall of the main body, a clamp arm structure configured for positioning atop the two or more flanges, the clamp arm structure comprising a clamp bar having an opening for the at least one screw, and an arm portion comprising a wedge shape formed therein configured to extend into the gap adjacent the top end, the wedge shape having a depth extending towards the bottom end, and a wide end terminating at an outer edge of the arm portion, wherein the wedge shape extends by the depth into the gap in the main body, and wherein as the clamp arm structure is moved toward the clamp wall, the wedge shape is configured to widen the gap and enlarge the diameter of the main body.

Particular embodiments may comprise one or more of the following features. The main body may include two edges forming the gap, the edges having a shape selected from the group consisting of: curled inwardly towards the center of the main body, straight, squared off towards the center of the main body, v shaped inwardly towards the center of the main body, and polygonal shaped edges. The main body may comprise a plurality of clips extending away from the main body, wherein each clip of a first portion of the plurality of clips is oriented in a downward direction and each clip of a second portion of the plurality of clips is oriented in an upward direction opposite the downward direction, and wherein the plurality of clips is configured to snap onto and hold the cable clamp to an edge of the wall opening of the electrical box. Each clip of the first portion of the plurality of clips is vertically aligned with a corresponding clip of the second portion of the plurality of clips to form a pair of clips, and wherein each pair of clips is configured to snap onto and hold the clamp to an edge of the wall opening of the electrical box. The plurality of clips may comprise one or more pairs of clips on each of a front side of the main body, and a back side of the main body, wherein each pair of clips may be configured to snap onto and hold the cable clamp to an edge of the wall opening of the electrical box. When each pair of clips is snapped onto and holding the cable clamp to the edge of the wall opening of the electrical box, the clips are configured to position the wall of the electrical box at a midsection of the main body. An outer edge of the arm portion of the clamp arm structure is configured to wrap around at least a portion of an edge of at least one of the two or more flanges to removably secure the clamp arm structure to the main body. The at least one screw is configured to tighten the clamp bar to grip the electrical cable and the wedge shape is configured to increase the diameter of the main body to secure the cable clamp within the wall opening.

Aspects of the document relate to an electrical box cable clamp comprising a main body configured to provide a pathway for an electrical cable through a wall opening in a wall of an electrical box, the main body having a gap in the main body extending from a top end to a bottom end and configured to enable a diameter of the main body to be enlarged by widening the gap and reduced by collapsing the gap, a clamp wall positioned on the top end of the main body, the clamp wall configured to contact the electrical cable, wherein the electrical cable passes adjacent the clamp wall when the electrical cable extends along the pathway through the main body, a clamp arm structure comprising a clamp bar configured to engage the electrical cable against the clamp wall, and an arm portion comprising a wedge shape formed therein configured to extend into the gap adjacent the top end, wherein the wedge shape has a wide end configured to span the gap and a depth configured to extend into the gap, and wherein as the clamp arm structure is moved toward the clamp wall, the wedge shape is configured to widen the gap and enlarge the diameter of the main body.

Particular embodiments may comprise one or more of the following features. The cable clamp may comprise a plurality of clips extending away from the main body, wherein each clip of a first portion of the plurality of clips is oriented in a downward direction and each clip of a second portion of the plurality of clips is oriented in an upward direction opposite the downward direction, and the first and second portions are vertically aligned, and wherein the plurality of clips is configured to snap onto and position the wall of the electrical box at a midsection of the main body. The main body may comprise at least one pair of clips on each of a front side of the main body, and a back side of the main body, wherein each pair of clips is configured to snap onto and hold the cable clamp to an edge of the wall opening of the electrical box. When the at least one screw is tightened, the wedge shape is configured to increase the diameter of the main body to secure the cable clamp within the wall opening. The main body may include one or more flanges positioned on opposing sides of the gap at the top end, extending away from the main body perpendicular to a side wall of the main body, and an outer edge of the arm portion of the clamp arm structure is configured to wrap around at least a portion of an edge of at least one of the two or more flanges to removably secure the clamp arm structure to the main body. The gap may be formed by two edges, the edges each having a shape selected from the group consisting of: curled inwardly towards the center of the main body, straight, squared off towards the center of the main body, v shaped inwardly towards the center of the main body, and polygon shaped edges. The clamp arm structure may be formed from a single unitary piece.

The foregoing and other aspects, features, and advantages will be apparent from the DESCRIPTION and DRAWINGS, and from the CLAIMS.

BRIEF DESCRIPTION OF THE DRAWINGS

Implementations will hereinafter be described in conjunction with the appended and/or included DRAWINGS, where like designations denote like elements, and.

DETAILED DESCRIPTION

Figure 1:
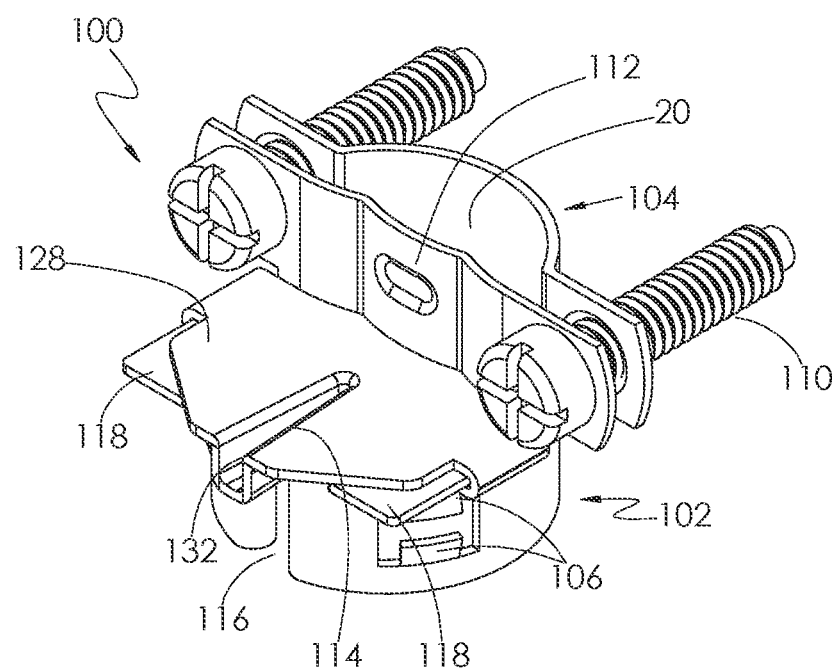
FIG. 1 is a representation of a right-side perspective view of a cable clamp with a wedge shape.

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

FIGS. 1-11 illustrate various views of a cable clamp 100 for an electrical junction box 10. The embodiment of the cable clamp 100 illustrated in the Figures is configured to enable easy installation and secure attachment to the electrical box 10. Additionally, the cable clamp 100 is configured to enable simpler removal of the cable clamp from the electrical box 10, as explained in more detail below. The cable clamp 100 comprises a main body 102 which may comprise one or more flanges 118, a clamp wall 104, a plurality of clips 106, and a clamp arm structure 128. The main body 102 is hollow and configured to provide a pathway 20 for at least one electrical cable 18 through a wall opening 12 in a wall 14 of the electrical box 10. The cable clamp 100 includes clips 106 in the side wall 124 of the main body 102 of the cable clamp 100 rather than being part of a separate spring-steel ring as is typically found in conventional cable clamps. Instead of the side wall 124 of the main body 102 of the cable clamp 100 being a continuous ring, it includes a gap 116 configured to allow the edges 140 of the side wall 124 of the main body 102 to be moveable toward and away from each other as the side wall 124 of the cable clamp 100 is squeezed or stretched, respectively. The main body 102 includes a gap 116 extending from a top end 108 to a bottom end 142 is configured to enable a diameter 154 of the main body 102 to be enlarged by widening the gap 116 to a diameter D2, and reduced by collapsing the gap 116 to a diameter D1. The gap 116 allows the diameter 154 of the main body 102 to decrease or increase. Thus, the main body 102, including the gap 116, comprises a discontinuous ring and may be sized to fit within the wall opening 12 of the electrical junction box 10.

Referring specifically to FIG. 1, a representation of a right-side perspective view of the electrical box cable clamp 100 is shown with wedge shape 114 formed in the clamp arm structure 128 and having a wide end 132 extending into gap 116 in main body 102. The clamp wall 104 is positioned on the top end 108 (depicted in FIG. 3) of the main body 102 and may have at least one screw 110 that, when rotated, is configured to move the clamp bar 112 and the clamp wall 104 towards or away from each other. In this way, when the electrical cable 18 extends through and adjacent to the clamp wall 104 along pathway 20, the screw 110 can be rotated to move the clamp bar 112 and the clamp wall 104 closer together and clamp an electrical cable 18 (depicted in FIG. 5) with the clamp bar 112 and the clamp wall 104 around the electrical cable 18. Thus, the screw 110 is configured to tighten the clamp wall 104 to grip the electrical cable 18. As depicted in FIG. 1, the at least one screw 110 is shown in a tightened position with the clamp bar 112 in close proximity to the clamp wall 104 of the main body 102 and with the electrical cable 18 within pathway 20. The cable clamp 100 further comprises one or more flanges 118 located atop the main body 102, and a plurality of clips 106 originating from the main body 102 and extending away from the main body 102.

Figure 2:
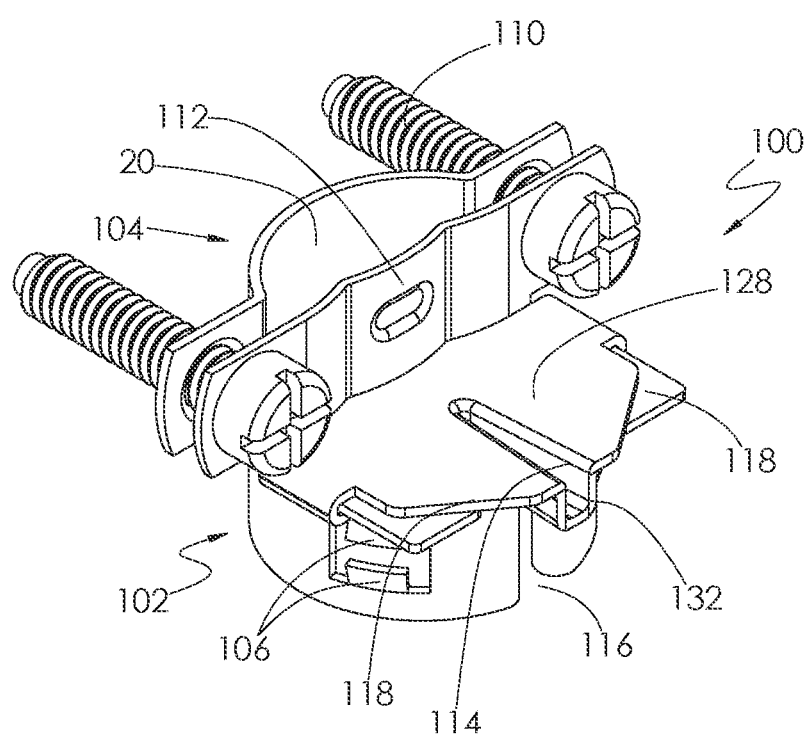
FIG. 2 is a representation of a left-side perspective view of the cable clamp of FIG. 1.

FIG. 2 illustrates a left-side perspective view of the electrical box cable clamp 100 of FIG. 1, emphasizing similar features to those emphasized in FIG. 1.

Figure 3:
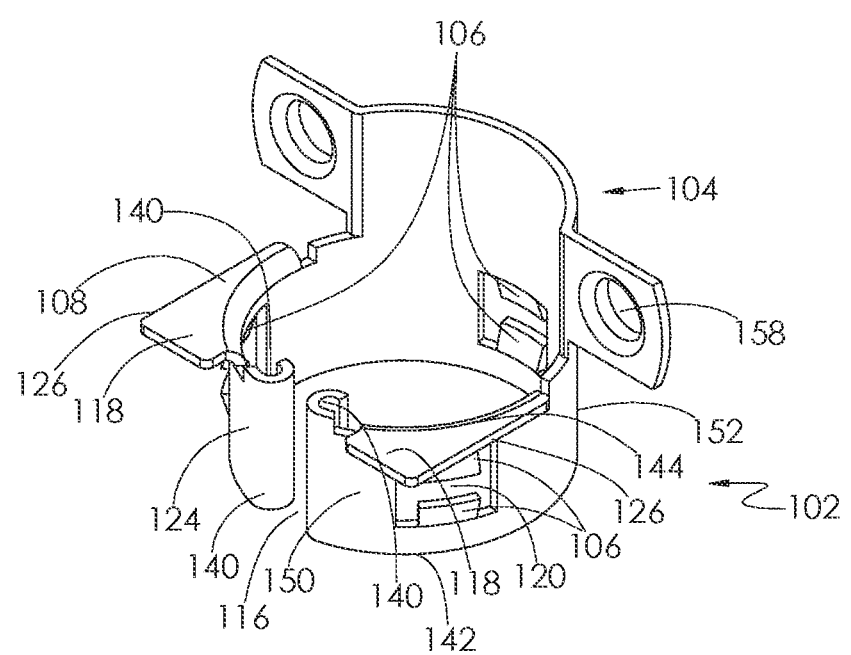
FIG. 3 is a representation of a perspective view of a main body of the cable clamp of FIG. 1.

FIG. 3 illustrates the main body 102 of the cable clamp 100 of FIG. 1. The main body 102 may include at least one flange 118 having an outer edge 126 positioned along the top end 108 of the main body 102. The at least one flange 118 is oriented perpendicular to a side wall 124 of the main body 102 and spans at least a portion of the circumference 144 of the main body. In an embodiment, the main body 102 may comprise two coplanar flanges 118, each having opposing, parallel outer edges 126 positioned symmetrically on either side of the gap 116 perpendicular to the side wall 124 of the main body 102. In other embodiments, the main body may not comprise a flange 118 in order to simplify manufacturing. While two flanges are shown, it is within the spirit and scope of the present disclosure to incorporate a single flange, no flange, or any other suitable number of flanges.

The clamp wall 104 may extend from the main body 102 and in some embodiments, the main body 102 and the clamp wall 104 are manufactured or formed together as a single piece and are integral to each other. The clamp wall comprises clamp wall holes 158 for passage of the screw 110.

The edges 140 of the side wall 124 of the main body 102 defining the gap 116 may be formed into various shapes to help the edges 140 to glide more smoothly along the wedge shape 114 of the arm portion 130 of the clamp arm structure 128. Edges 140 may not be formed at all (straight edges), or the edges 140 may be inwardly curled, partially squared off, in a v shape, or other polygonal shaped edges, each of these edge shapes formed inwardly towards the center of the main body 102. While curling the edges 140 inwardly towards the main body 102 helps the edges 140 to glide more smoothly on the wedge shape 114 of the arm portion 130, curling is not a requirement and other shapes and configurations may alternatively be used, without departing from the spirit and scope of the disclosure.

The main body 102 further comprises a plurality of clips 106 originating from the main body 102 of the cable clamp 100 and located on each of a front side 150, and a back side 152 of main body 102. This is different from a conventional cable clamp that has a metal ring that wraps around the body of the clamp. Instead, the clips 106 directly originate from the main body 102 and extend away from the main body 102. In other words, in some embodiments, the main body 102 and the clips 106 are manufactured or formed together as a single piece and are integral to each other. This makes the location of the clips 106 more predictable because they are fixed in position with respect to the main body 102. Thus, even if the clips 106 are no longer visible after the cable clamp 100 has been inserted into electrical box 10, the user can still locate the clips 106 more easily.

Figure 4:
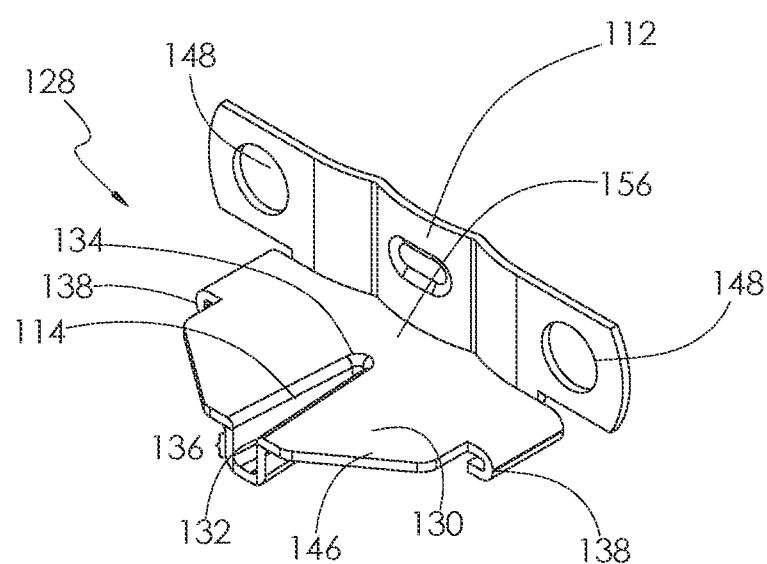
FIG. 4 is a representation of a perspective view of a clamp arm structure of the cable clamp of FIG. 1.

FIG. 4 illustrates a perspective view of the clamp arm structure 128 of the cable clamp 100 as depicted in FIG. 1. The clamp arm structure 128 comprises the clamp bar 112 and an arm portion 130. The clamp arm structure 128 may be positioned atop the flanges 118, or in embodiments that do not have flanges, positioned on the top end 108 of the main body 102. The clamp bar 112 comprises at least one opening 148 for the at least one screw 110 and is configured to be tightened by the at least one screw 110 to engage and secure the electrical cable 18 as the clamp arm structure 128 is moved towards the clamp wall 104. The arm portion 130 of the clamp arm structure 128 is configured to be perpendicular to the clamp bar 112 and in those embodiments comprising a flange 118 as part of the main body 102, the arm portion 130 further comprises an open hem 138 configured to wrap around at least a portion of the outer edges 126 of the at least one flange 118. The open hem 138 of the arm portion 130 is configured to wrap around at least a portion of an outer edge of the flanges 126 (depicted in FIG. 8) and removably secure the clamp arm structure 128 to the main body 102. As described with reference to FIG. 1, the arm portion 130 includes a wedge shape 114 formed therein, the wedge shape 114 having a narrow end 134 located within an interior 156 of the arm portion, and a wide end 132 terminating at an outer edge 146 of the arm portion 130. The wedge shape 114 extends by the depth 136 towards the bottom end 142 of the main body 102 and is configured to extend into the gap 116 of the main body 102. As the clamp arm structure 128 is moved toward the clamp wall 104, the wedge shape 114 is configured to move along edges 140 and thereby widen the gap 116 and enlarge the diameter 154 of the main body 102. In this way, the cable clamp 100 is secured within the wall opening 12 of the electrical junction box 10.

Figure 5:
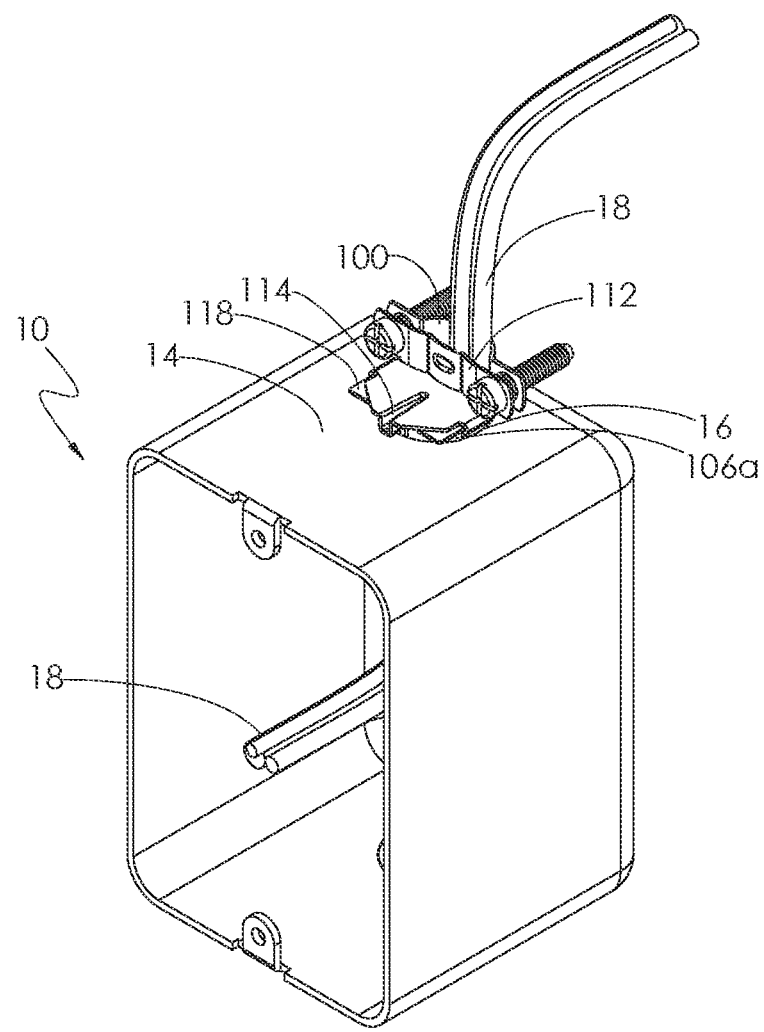
FIG. 5 is a representation of a perspective view of the cable clamp shown in FIG. 1 coupled with an electrical box.

FIG. 5 illustrates a perspective view of the cable clamp 100 shown in FIG. 1 coupled with the electrical box 10. In operation, once the electrical cable 18 has been passed through the cable clamp 100 and into the electrical box 10, the clamp arm structure 128 can be attached to the main body 102 of the cable clamp 100 and the clamp arm structure 128 can be moved towards the clamp wall 104 to grip the electrical cable 18. When the cable clamp 100 is positioned within the opening of the wall 12 of the electrical junction box 10, tightening of the at least one screw 110 forces the wedge shape 114 into the gap 116 between the edges 140 of the arm portion 130 of the clamp arm structure 128, and separates the edges 140 the farther the at least one screw 110 is tightened. Tightening of the screws and separation of the edges 140 enlarges the diameter 154 of the cable clamp 100 to more securely position the cable clamp 100 within the wall 14 of the electrical junction box 10. This operates to lock the cable clamp 100 into the wall 14 of the electrical junction box 10. This secures the electrical cable 18 in place and decreases the chance that the electrical cable 18 will get tugged on and removed from the electrical box 10. Particularly where a steel cable connector clamp is used with a steel junction box, the engagement is solid and secure. The clamp wall 104 is still accessible outside of the electrical box 10 after the cable clamp 100 has been installed in the electrical box 10. This allows the clamp wall 104 to be tightened onto the electrical cable as explained above.

The clips 106 are configured to allow the cable clamp 100 to insert into and snap onto the wall opening 12 of the wall 14 of the electrical box 10. For example, the clips 106 may extend away from the main body 102 at an angle such that the cable clamp 100 is sized larger than the wall opening 12 at the clips 106. The clips 106 may be configured to elastically deform as the cable clamp 100 is inserted into the wall opening 12, thus allowing the cable clamp 100 to be inserted, and then snapping back to their original configuration once the wall 14 of the electrical box 10 passes the clips 106. This helps to secure the cable clamp 100 within the wall opening 12. In this way, the clips 106 are configured to hold the cable clamp 100 to an edge 16 of the wall opening 12 of the electrical box 10.

Thus, it is desirable for the cable clamp 100 to have a secure connection with the electrical box 10 because if the cable clamp 100 disconnects from the electrical box 10, the electrical cable is no longer secured in place. To release the cable clamp 100 from the electrical junction box 10, the screws 110 can simply be loosened to move the wedge shape 114 out of the way and then the main body 102 of the cable clamp 100 can be manually squeezed and pulled out of the electrical box 10. Manufacturing of this design is simpler and less expensive than previous designs, and for particular applications, this design provides a more advantageous arrangement for clamping the cable 18 securely to an electrical junction box 10.

Figure 6:
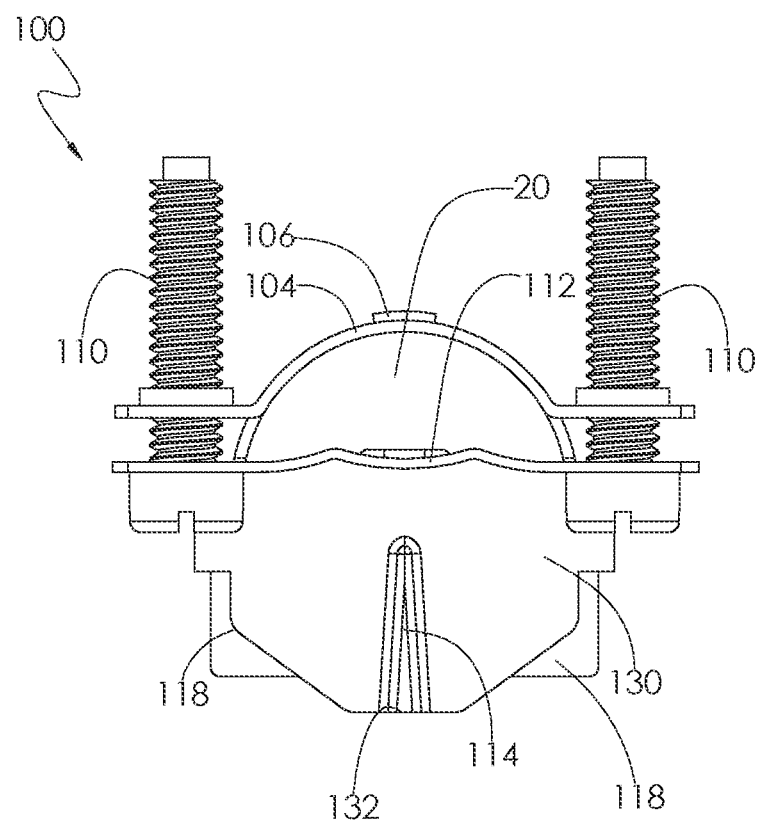
FIG. 6 is a representation of a top view of the cable clamp shown in FIG. 1.

FIG. 6 depicts a top view of the cable clamp 100 shown in FIG. 1 with the arm portion 130 of the clamp arm structure 128 extending over two flanges 118. Clips 106 are shown on the back side 152 of the main body 102. Pathway 20 for the electrical cable 18 is also depicted.

Figure 7A:
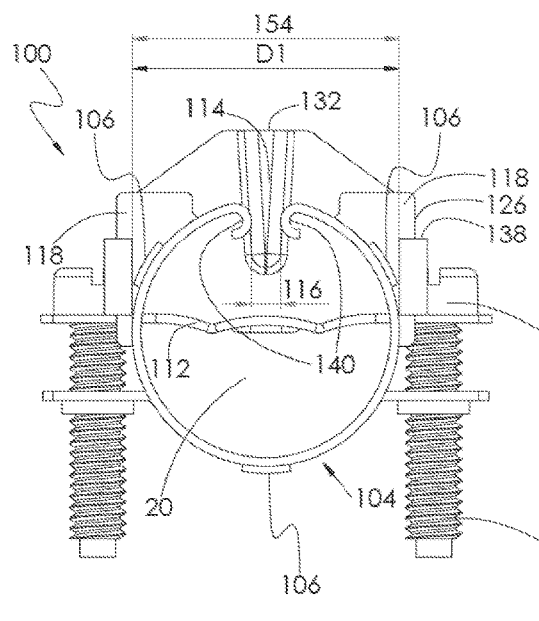
FIG. 7A is a representation of a bottom view of the cable clamp shown in FIG. 1 prior to securing the electrical cable.
Figure 7B:
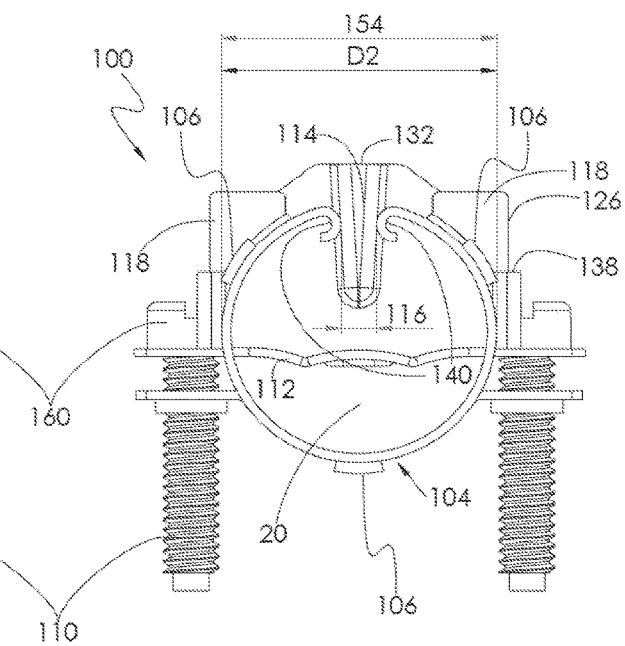
FIG. 7B is a representation of a bottom view of the cable clamp shown in FIG. 1 after securing the electrical cable.

FIGS. 7A and 7B depict a bottom view of the cable clamp 100. FIG. 7A depicts the cable clamp 100 before tightening of screws 110 with a narrower diameter 154 of D1, and FIG. 7B shows the cable clamp 100 after tightening of screws 110 with a wider diameter 154 of D2. As seen in FIG. 7A, screws 110 have not been tightened to move the clamp bar 112 of the clamp arm structure 128 (as depicted in FIG. 4) towards the clamp wall 104. Thus, ends 140 defining gap 116 are located at the narrow end 134 (as depicted in FIG. 4) of the wedge shape 114, and the diameter 154 (shown here as D1) is configured to allow insertion of the cable clamp 100 into wall opening 12 of the electrical box 10. As shown in FIG.

7B, screws 110 have been tightened to move the clamp bar 112 of the clamp arm structure 128 closer to, or in contact with, the clamp wall 104. Thus, as the clamp arm structure 128 is moved toward the clamp wall 104, ends 140 defining gap 116 are positioned closer to the wide end 132 of wedge shape 114 (as depicted in FIG. 4), and the wedge shape 114 is configured to widen the gap 116 and enlarge the diameter 154 (shown as D2) of the main body 102, such that D2 is greater than D1, and the diameter 154 (shown as D2) is configured to secure the cable clamp 100 in a static position in wall opening 12 of the electrical box 10.

Figure 8:
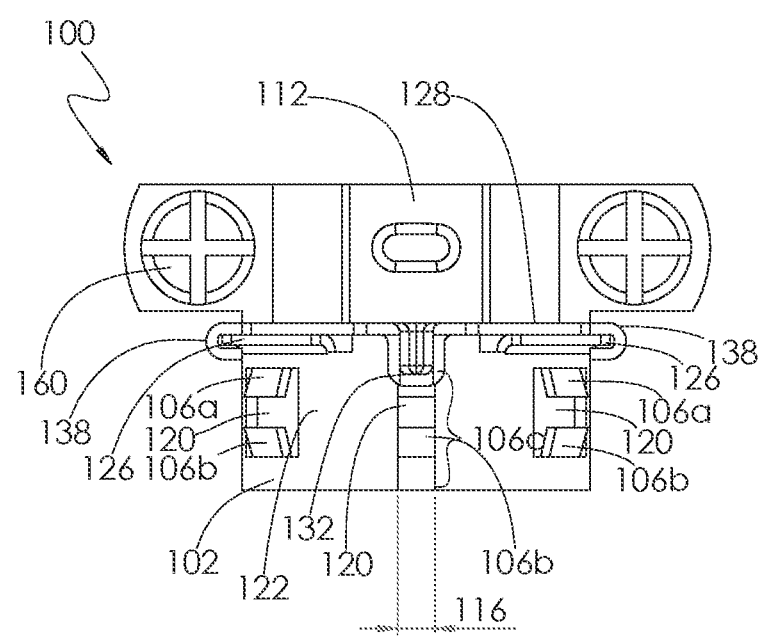
FIG. 8 is a representation of a front view of the cable clamp shown in FIG. 1.

FIG. 8 illustrates a front view of cable clamp 100, depicting the open hem 138 of the clamp arm structure 128 wrapped around the outer edge 126 of the flange 118, thereby securing the clamp arm structure 128 atop the main body 102. Further illustrated is the wide end 132 of the wedge shape 114 extending into gap 116, and the clamp bar 112 positioned atop the clamp arm structure 128, the clamp bar 112 comprising screws 110 with screw heads 160 in position within clamp bar 112.

Still referring to FIG. 8, the clips 106 may be divisible into a first portion of clips 106a and a second portion of clips 106b. Each clip 106a of the first portion of clips 106a is oriented in a downward direction such that as each clip 106a of the first portion of clips 106a extends away from the main body 102, the clip 106a also extends away from the top end 108 of the main body 102. On the other hand, each clip 106b of the second portion of clips 106b is oriented in an upward direction opposite the downward direction such that as each clip 106b of the second portion of clips 106b extends away from the main body 102, the clip 106b also extends towards the top end 108 of the main body 102. Thus, when the cable clamp 100 is inserted into the wall opening 12 with a bottom end 142 of the main body 102 first, where the bottom end 142 is opposite the top end 108, the clips 106b of the second portion of clips 106b are elastically deformed until the clips 106b of the second portion of clips 106b pass the wall 14, enter the electrical box 10, and snap back to their original configuration as described above. The clips 106a of the first portion of clips 106a, on the other hand, are not deformed when the cable clamp 100 is inserted into the wall opening 12 with the bottom end 118 first. Instead, in such a situation, the clips 106a of the first portion of clips 106a act to limit movement between the cable clamp 100 and the electrical box 10.

The clips comprising the first portion 106a and the second portion 106b are separated by space 120 that is sized to be similar to a thickness of the wall 14 of the electrical box 10. Thus, once the cable clamp 100 is inserted into the wall opening 12, the clips 106a of the first portion of clips 106a and the clips 106b of the second portion of clips 106b hold the cable clamp 100 securely to an edge 16 of the wall opening 12 of the electrical box 10, without allowing a large amount of movement between the cable clamp 100 and the electrical box 10. In some embodiments, the clips 106b of the second portion of clips 106b and the clips 106a of the first portion of clips 106a are configured to position the wall 14 of the electrical box 10 at a midsection 122 of the main body 102.

Each clip 106a of the first portion of clips 106a may be vertically aligned with a corresponding clip 106b of the second portion of the clips 106b to form of pair of clips 106c. Each pair of clips 106c is configured to snap onto and hold the cable clamp 100 to the edge 16 of the wall opening 12 of the electrical box 10 as described above. In some embodiments, the cable clamp 100 has two pairs of clips 106c positioned on opposing sides of the main body 102. In some embodiments, the pair of clips 106c may also be misaligned such that the clips 106 alternate between a clip 106b of the second portion of the clips 106b, and a clip 106a of the first portion of clips 106a around a circumference of the main body 102.

Figure 9:
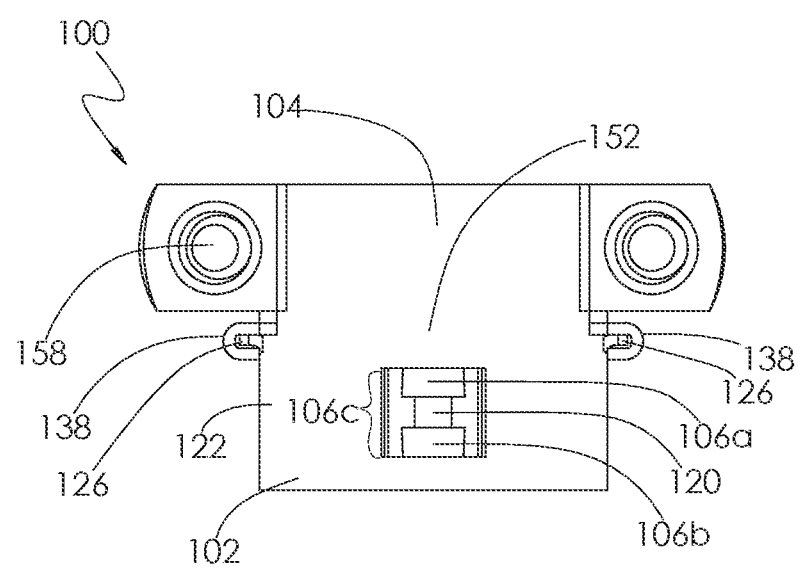
FIG. 9 is a representation of a back view of the cable clamp shown in FIG. 1.

Referring to FIG. 9, shown is a back view of cable clamp 100, depicting clamp wall 104 comprising clamp wall holes 158, a pair of open hems 138 configured to wrap around at least a portion of the outer edges 126 of the at least one flange 118 (as depicted in FIG. 1). First portion of clips 106a, and second portion of clips 106b, forming the pair of clips 106c, with space 120 located at midsection 122 are also shown on the backside 152 of the main body 102.

Figure 10:
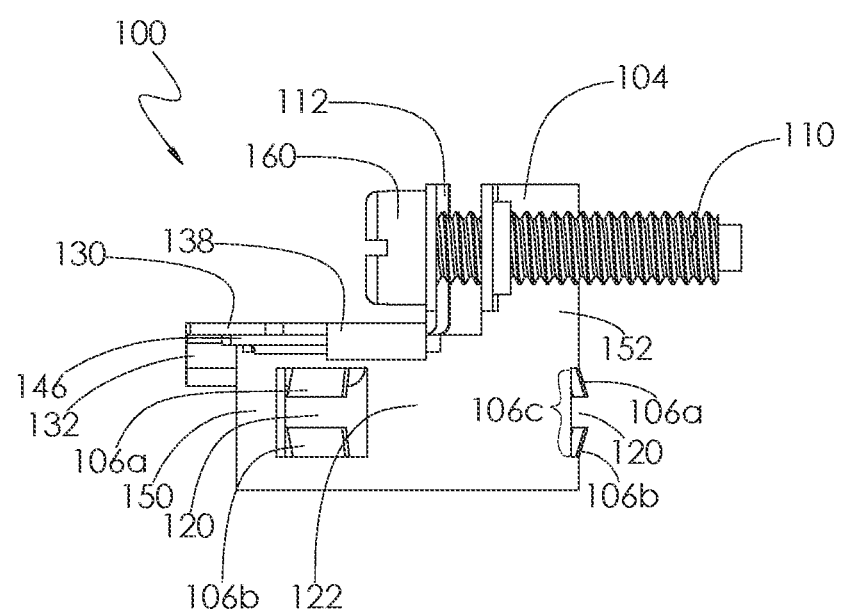
FIG. 10 is a representation of a right-side view of the cable clamp shown in FIG. 1.
Figure 11:
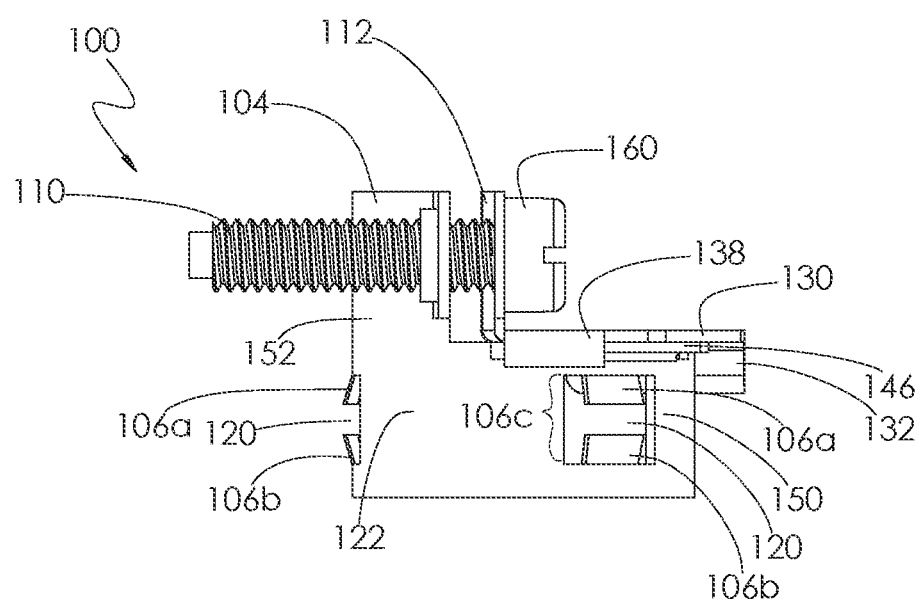
FIG. 11 is a representation of a left-side view of the cable clamp shown in FIG. 1.

FIGS. 10 and 11 illustrate right-side and left-side views of cable clamp 100, respectively. Depicted in each is the screw 110 comprising screw head 160, configured to position the clamp bar 112 of the clamp arm structure 128 (depicted in FIG. 4) in close proximity to and, when the cable clamp 100 is fully installed, adjacent to or in contact with, the clamp wall 104. Further illustrated in each is the arm portion 130 of the clamp arm structure 128 wrapping around the outer edge 126 of the flange 118 to form the open hem 138 to secure the clamp arm structure 128 to main body 102. The wide end 132 of the wedge shape 114 is depicted extending from the front side 150 of the main body 102. First portion 106a of the plurality of clips, second portion 106b of the plurality of clips, comprising the pair of clips 106c and space 120 are shown at a midsection 122 of the main body 102, on each of the front side of the main body 150, and the back side of the main body 152. Because the diameter 154 of the main body 102 can be enlarged by pressing the wedge shape 114 into the gap 116, additional spacers are not needed to secure the main body 102 into the opening of an electrical box.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

Many additional implementations of the cable clamp are possible. Further implementations are within the CLAIMS.

It will be understood that implementations of the cable clamp include but are not limited to the specific components disclosed herein, as virtually any components consistent with the intended operation of various cable clamps may be utilized. Accordingly, for example, it should be understood that, while the drawings and accompanying text show and describe particular cable clamp implementations, any such implementation may comprise any shape, size, style, type, model, version, class, grade, measurement, concentration, material, weight, quantity, and/or the like consistent with the intended operation of the cable clamp.

The concepts disclosed herein are not limited to the specific cable clamp shown herein. For example, it is specifically contemplated that the components included in particular cable clamps may be formed of any of many different types of materials or combinations that can readily be formed into shaped objects and that are consistent with the intended operation of the cable clamp. For example, the components may be formed of: rubbers (synthetic and/or natural) and/or other like materials; glasses (such as fiberglass), carbon-fiber, aramid-fiber, any combination therefore, and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, embodiments of the cable clamp may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, brazing, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a cable clamp for an electrical junction box, it should be readily apparent that a number of modifications may be made without departing from the spirit thereof and that these implementations may be applied to other implementations disclosed or undisclosed. The presently disclosed cable clamp implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. An electrical box cable clamp comprising:
   a hollow, cylindrical main body configured to provide a pathway for an electrical cable through a wall opening in a wall of an electrical box, the cylindrical main body having a gap in the main body extending vertically from a top end to a bottom end such that the main body is discontinuous wherein the ends forming the gap are curled inwardly;
   a clamp wall positioned on the top end of the main body, the clamp wall having at least two screws, wherein the clamp wall is configured to contact the electrical cable, wherein the electrical cable passes adjacent the clamp wall when the electrical cable extends along the pathway through the main body;
   a pair of coplanar flanges positioned symmetrically on either side of the gap along a circumference of the top end, wherein the pair of coplanar flanges extend perpendicular to a side wall of the main body, each of the coplanar flanges comprising an opposing, parallel outer edge extending away from a respective side wall of the main body;
   a plurality of clips originating from the main body and extending away from the main body, wherein each clip of a first portion of the plurality of clips is oriented in a downward direction and each clip of a second portion of the plurality of clips is oriented in an upward direction opposite the downward direction, wherein each clip of the first portion of the plurality of clips is vertically aligned with a corresponding clip of the second portion of the plurality of clips to form a pair of clips, and wherein each pair of clips is configured to snap onto and hold the cable clamp to an edge of the wall opening of the electrical box;
   a clamp arm structure configured for positioning atop the flanges, the clamp arm structure comprising a clamp bar having an opening for the at least one screw and configured to engage the electrical cable against the clamp wall, and an arm portion connected perpendicular to the clamp bar, wherein the arm portion comprises two opposing edges having a pair of opposing, parallel open hems configured to wrap around the outer edges of the pair of flanges, the arm portion further comprising a wedge shape formed therein configured to extend into the gap adjacent the top end, the wedge shape having a depth extending towards the bottom end, a narrow end located near a center of the arm portion, and a wide end terminating at an outer edge of the arm portion, and wherein as the clamp arm structure is moved toward the clamp wall, the wedge shape is configured to widen the gap and enlarge the diameter of the main body.

2. The electrical box cable clamp of claim 1, wherein the plurality of clips comprises one or more pairs of clips on a front side of the main body.

3. The electrical box cable clamp of claim 1, wherein the plurality of clips further comprises one or more pairs of clips on a back side of the main body.

4. The electrical box cable clamp of claim 1, wherein the clamp arm structure comprises a single, unitary piece.

5. The electrical box cable clamp of claim 1, wherein the at least two screws are configured to tighten the clamp bar to grip the electrical cable and the wedge shape is configured to increase the diameter of the main body to secure the cable clamp within the wall opening.

6. The electrical box cable clamp of claim 1, wherein when each pair of clips is snapped onto and holding the cable clamp to the edge of the wall opening of the electrical box, the wall of the electrical box is positioned at a midsection of the main body.

7. An electrical box cable clamp comprising:
   a hollow main body configured to provide a pathway for an electrical cable through a wall opening in a wall of an electrical box, the main body having a gap in the main body extending from a top end to a bottom end and configured to enable a diameter of the main body to be enlarged by widening the gap and reduced by collapsing the gap;
   a clamp wall positioned on the top end of the main body, the clamp wall having at least one screw and configured to contact the electrical cable, wherein the electrical cable passes adjacent the clamp wall when the electrical cable extends along the pathway through the main body;
   two or more flanges positioned on opposing sides of the gap at the top end and extending away from the main body perpendicular to a side wall of the main body;
   a clamp arm structure configured for positioning atop the two or more flanges, the clamp arm structure comprising a clamp bar having an opening for the at least one screw, and an arm portion comprising a wedge shape formed therein configured to extend into the gap adjacent the top end, the wedge shape having a depth extending towards the bottom end, and a wide end terminating at an outer edge of the arm portion, wherein the wedge shape extends by the depth into the gap in the main body, and wherein as the clamp arm structure is moved toward the clamp wall, the wedge shape is configured to widen the gap and enlarge the diameter of the main body.

8. The electrical box cable clamp of claim 7, wherein the main body includes two edges forming the gap, the edges having a shape selected from the group consisting of: curled inwardly towards the center of the main body, straight, squared off towards the center of the main body, v shaped inwardly towards the center of the main body, and polygonal shaped edges.

9. The electrical box cable clamp of claim 7, wherein the main body comprises a plurality of clips extending away from the main body, wherein each clip of a first portion of the plurality of clips is oriented in a downward direction and each clip of a second portion of the plurality of clips is oriented in an upward direction opposite the downward direction, and wherein the plurality of clips is configured to snap onto and hold the cable clamp to an edge of the wall opening of the electrical box.

10. The electrical box cable clamp of claim 9, wherein each clip of the first portion of the plurality of clips is vertically aligned with a corresponding clip of the second portion of the plurality of clips to form a pair of clips, and wherein each pair of clips is configured to snap onto and hold the clamp to an edge of the wall opening of the electrical box.

11. The electrical box cable clamp of claim 10, wherein the plurality of clips comprises one or more pairs of clips on each of a front side of the main body, and a back side of the main body, wherein each pair of clips is configured to snap onto and hold the cable clamp to an edge of the wall opening of the electrical box.

12. The electrical box cable clamp of claim 7, wherein an outer edge of the arm portion of the clamp arm structure is configured to wrap around at least a portion of an edge of at least one of the two or more flanges to removably secure the clamp arm structure to the main body.

13. The electrical box cable clamp of claim 7, wherein the at least one screw is configured to tighten the clamp bar to grip the electrical cable and the wedge shape is configured to increase the diameter of the main body to secure the cable clamp within the wall opening.

14. An electrical box cable clamp comprising:
a main body configured to provide a pathway for an electrical cable through a wall opening in a wall of an electrical box, the main body having a gap in the main body extending from a top end to a bottom end and configured to enable a diameter of the main body to be enlarged by widening the gap and reduced by collapsing the gap;
a clamp wall positioned on the top end of the main body, the clamp wall configured to contact the electrical cable, wherein the electrical cable passes adjacent the clamp wall when the electrical cable extends along the pathway through the main body;
a clamp arm structure comprising a clamp bar configured to engage the electrical cable against the clamp wall, and an arm portion comprising a wedge shape formed therein configured to extend into the gap adjacent the top end, wherein the wedge shape has a wide end configured to span the gap and a depth configured to extend into the gap, and wherein as the clamp arm structure is moved toward the clamp wall, the wedge shape is configured to widen the gap and enlarge the diameter of the main body.

15. The electrical box cable clamp of claim 14, further comprising a plurality of clips extending away from the main body, wherein each clip of a first portion of the plurality of clips is oriented in a downward direction and each clip of a second portion of the plurality of clips is oriented in an upward direction opposite the downward direction, and the first and second portions are vertically aligned, and wherein the plurality of clips is configured to snap onto and position the wall of the electrical box at a midsection of the main body.

16. The electrical box cable clamp of claim 15, wherein the main body comprises at least one pair of clips on each of a front side of the main body, and a back side of the main body, wherein each pair of clips is configured to snap onto and hold the cable clamp to an edge of the wall opening of the electrical box.

17. The electrical box cable clamp of claim 14, wherein when the at least one screw is tightened, the wedge shape is configured to increase the diameter of the main body to secure the cable clamp within the wall opening.

18. The electrical box cable clamp of claim 14, wherein the main body includes one or more flanges positioned on opposing sides of the gap at the top end, extending away from the main body perpendicular to a side wall of the main body, and an outer edge of the arm portion of the clamp arm structure is configured to wrap around at least a portion of an edge of at least one of the two or more flanges to removably secure the clamp arm structure to the main body.

19. The electrical box cable clamp of claim 14, wherein the gap is formed by two edges, the edges each having a shape selected from the group consisting of: curled inwardly towards the center of the main body, straight, squared off towards the center of the main body, v shaped inwardly towards the center of the main body, and polygon shaped edges.

20. The electrical box cable clamp of claim 14, wherein the clamp arm structure is formed from a single unitary piece.

* * * * *